No. 765,443.  
Patented July 19, 1904.

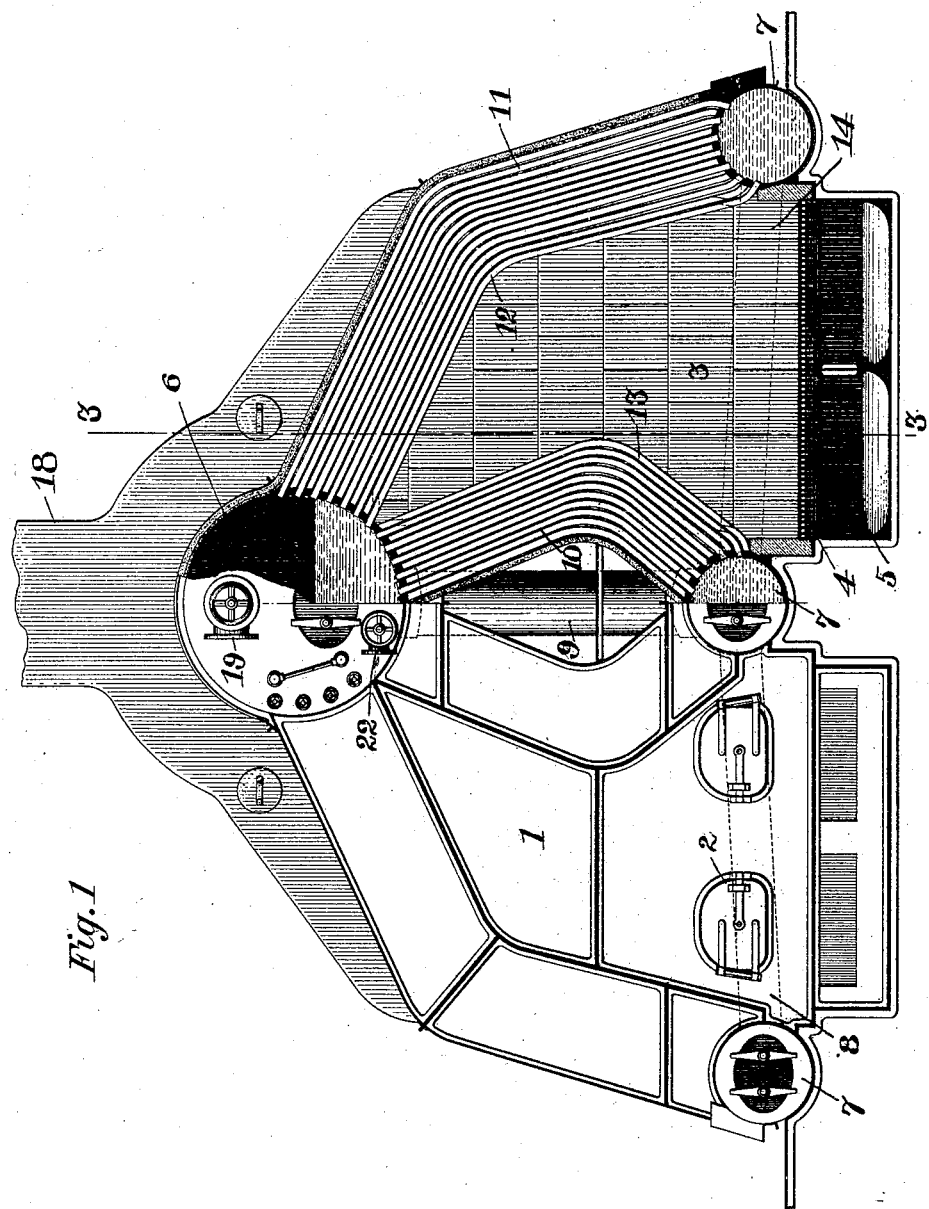

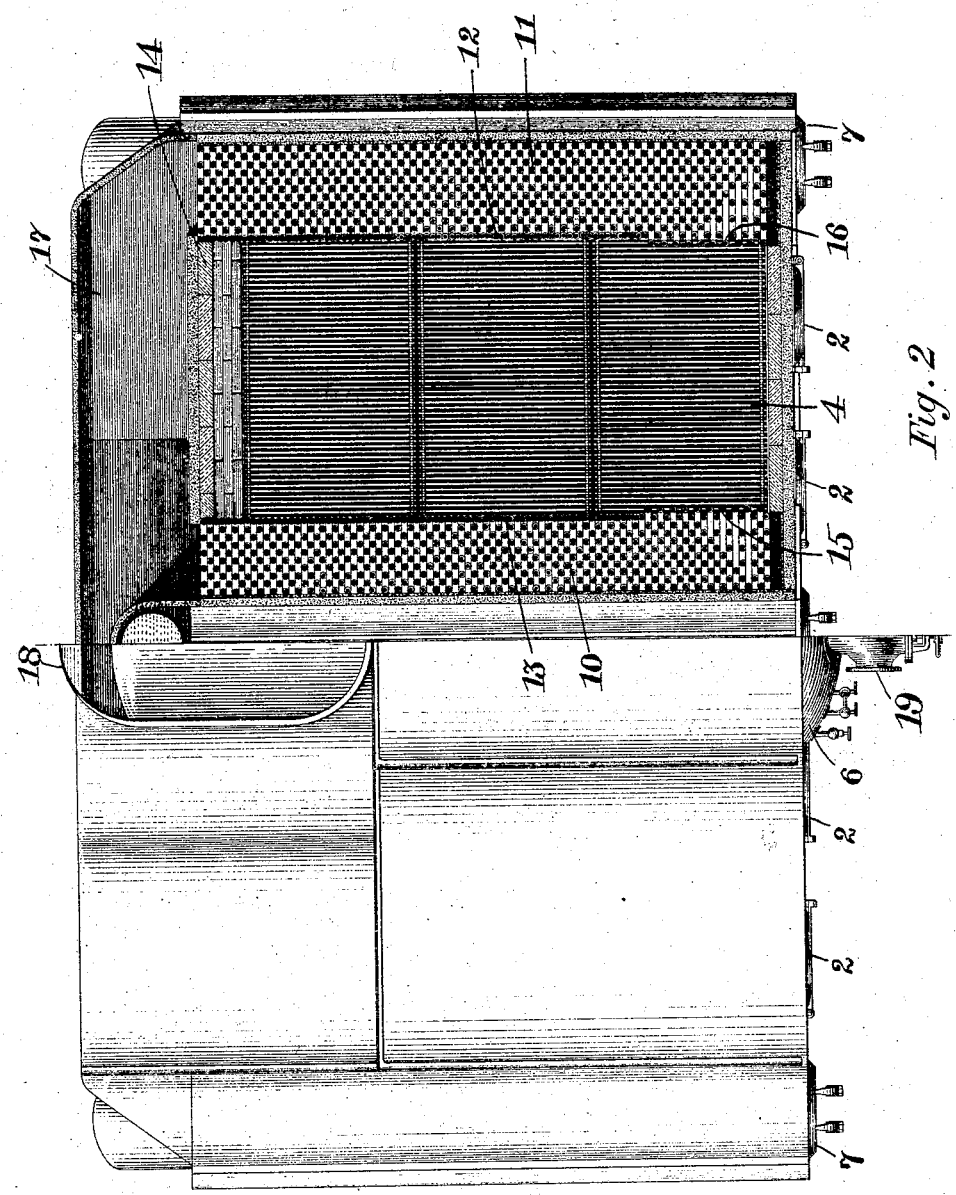

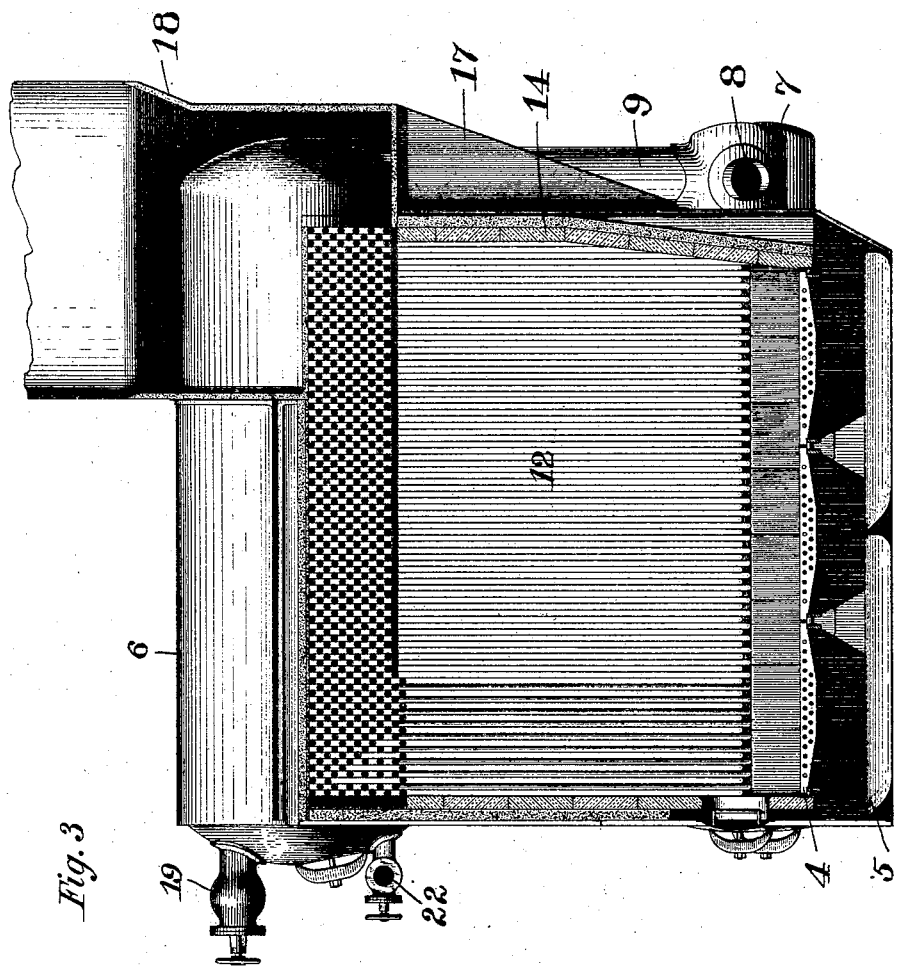
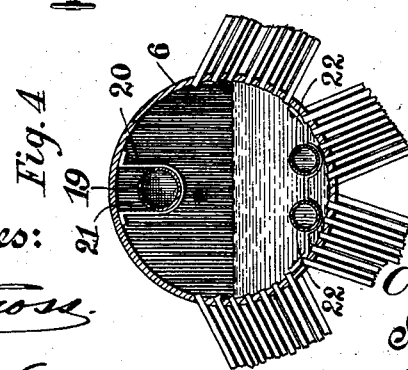

UNITED STATES PATENT OFFICE.

CHARLES L. SEABURY, OF NEW YORK, N. Y.

WATER-TUBE BOILER.

SPECIFICATION forming part of Letters Patent No. 765,443, dated July 19, 1904.

Application filed October 9, 1902. Serial No. 126,454. (No model.)

*To all whom it may concern:*

Be it known that I, CHARLES L. SEABURY, a citizen of the United States, and a resident of the city of New York, State of New York, have invented certain new and useful Improvements in Water-Tube Boilers, of which the following is a full, clear, and exact description, reference being had to the accompanying drawings, forming part of this specification.

This invention relates to certain improvements in water-tube steam-boilers, and particularly to that class wherein the water is caused to circulate between upper and lower drums through the medium of small tubes located between the same—such, for instance, as the character of boiler illustrated and described in my United States Letters Patent Nos. 497,432 and 523,489.

The object of my present invention is to generally improve the construction of this class of water-tube boilers by increasing the capacity thereof and overcoming certain objections now existing both in the construction and operation of the same and obtaining the very best results without increasing the amount of fuel used.

In boilers of the class to which this invention relates a very rapid circulation of the water is effected, and the aim is to dispose and arrange the water-tubes in their relation to the furnace and flues in such a manner that the water contained therein will absorb a maximum quantity of the heat developed in the combustion of the fuel. During the course of my experiments I have found that a most important feature of this class of boilers is that the disposition and arrangement of the water-tubes shall be such that the products of combustion shall be guided and directed in, around, and about the said water-tubes in the most efficient manner, so that the greatest amount of absorption of heat by the water contained in said tubes shall be accomplished, at the same time facilitating the passage of heat-currents in and about a maximum area of tubing. In my prior inventions hereinbefore referred to this was accomplished to a certain extent; but my present invention embodies a construction and arrangement for producing much more favorable results on these general lines by reason of the arrangement and distribution of the parts in their relation to each other so that the greatest amount of absorbed heat is effected in the circulating columns of water, while at the same time the currents of heat from the furnace are permitted to travel around the said series of tubes quite freely, thus allowing that portion of the tubing in the line of passage of the heat-currents at a distance from the furnace proper an opportunity to absorb a good proportion of the heat. In other words, a more even distribution of the heat is effected in my present invention throughout the series of columns of water circulating in said tubing, while at the same time a maximum quantity of the heat from the products of combustion is utilized with the least possible waste, thereby bringing about a saving in the consumption of fuel, and consequently cheapening the cost of operating the boiler.

In order to accomplish the results above described, I arrange one or more series of water-tubes immediately adjacent the combustion-chamber of the furnace in such a manner as to be exposed to the flames directly on two or more sides of the furnace, the tubes of each series being in such close relation to each other as to practically form the furnace-wall and to direct the products of combustion toward one end or the other of the furnace where the tubes are separated and staggered. Between the said rows of closely-arranged tubing and the outer wall of the furnace, disposed for a considerable portion of their lengths substantially perpendicularly, are a number of series of similarly-disposed tubings separated from each other, preferably staggered relatively to each other, so as to afford a free passage for the products of combustion and for directing the currents of the same through the separated series of tubings in a direction lengthwise of the furnace to their ultimate exit or connection with the flue.

I am aware that numerous constructions have heretofore been made embodying series of water-tubes in steam-boilers arranged so that the products of combustion from the furnace in their passage to the exhaust-flues may pass about the said tubing. Therefore I do not desire to claim the same broadly, my invention in this respect residing mainly in the improved construction and arrangement hereinafter particularly set forth, and pointed out in the appended claims.

Referring to the accompanying drawings, in which similar reference-numerals are used to indicate like parts, Figure 1 is a front elevation, partly in section, of a water-tube boiler constructed in accordance with my invention. Fig. 2 is a plan view of the same, partly in section. Fig. 3 is a vertical sectional elevation taken about on the line 3 3 of Fig. 1. Fig. 4 is a detail view in cross-section of the upper drum.

In the construction shown in the drawings, 1 designates an outer shell or casing, which may be made of the desired shape or form for inclosing the series of water-tubes. The front wall of the said casing is provided with suitable doors, as 2, through which access may be had to the fire-box or furnace 3. The side walls of the casing 1 are preferably lined with a layer of magnesia, located against the interior of the outer shell, and an inner lining of asbestos cardboard. At the front and rear of the combustion-chamber or furnace I provide on the inside of the magnesia lining a wall or backing composed of fire-brick, as illustrated in Figs. 2 and 3 of the drawings. The lower portion of the furnace is provided with a suitable grate 4 and an ash-pit 5, located under the said grate, as shown.

In the upper central portion of the boiler-casing I provide a horizontally-disposed drum 6, having its forward end projecting slightly outside of the wall of the boiler-casing and its rear end extending into the upper portion of the boiler-flue or stack-casing, as illustrated in Fig. 3 of the drawings. In the lower portion of the boiler-casing are supported the water-drums 7, disposed horizontally on each side of the combustion-chamber at a point adjacent to the fire-boxes, as illustrated most clearly in Fig. 1 of the drawings. The said water-drums are connected by means of the pipes 8. (Illustrated by the dotted lines in Fig. 1 and shown in section in Fig. 3 of the drawings.) At the rear end of the boiler I provide the water-leg 9, which is connected at its upper end to the rear portion of the main drum 6 and at its lower end to the centrally-disposed water-drum 7. The lower portion of the water-leg 9 is located outside of the boiler-casing, as shown in Fig. 3 of the drawings, and the rear ends of the water-drum 7 also project outside of the rear wall of the casing.

On each side of the combustion-chamber 3 are located the water-tubes 10 and 11, the tubes 11 being located on the outer side of said chamber and communicating at their lower ends with the outer water-drum 7 and at their upper ends with the main drum 6. These tubes 11 run substantially parallel to each other in a slanting direction toward the center of the combustion-chamber and in about their centers are bent and extend upwardly in a slanting direction to the main drum 6, thus extending along one side and over the top of combustion-chamber 3 through the entire depth of said chamber. The inner series of tubes, as 12, are set close together from a point within a short distance of the front end of the combustion-chamber, thus forming a solid wall on the side and top of the said combustion-chamber and forming a flue between the wall so formed and the outer casing of the boiler-frame. The tubes 11, which are located in the flue thus formed, are set apart or away from each other and staggered, as illustrated in Fig. 2 of the drawings, thus providing a space around the said tubes for the circulation of the heat and the products of combustion. The solid wall of tubes 12 is formed by bending the inner row of staggered tubes at their lower ends in such manner as to bring them in line with the second row of staggered tubes, this bend being shown in dotted lines in Fig. 1 of the drawings.

The tubes 10, which are located on the inside of the combustion-chamber 3, communicate at their lower ends with the centrally-disposed water-tube 7 and at their upper ends with the main drum 6. These tubes 10 run substantially parallel to each other and extend upwardly from the said drum 7 in a slanting direction toward the center of the combustion-chamber 3, where they are bent and extend upwardly in an oppositely-slanting direction, where they enter the main drum 6, as before described. The inner series of tubes 13 are located side by side touching each other, so as to form a solid wall from the rear end of the furnace to a point within a short distance of the front end, as illustrated in Fig. 2 of the drawings, thus forming a separate chamber or flue between the said tubes 13 and the middle wall of the boiler-casing 1. The tubes 10, located in this flue, are arranged a short distance away from each other and staggered in the same manner as the tubes 11 on the other side of the combustion-chamber, so as to allow the heat and other products of combustion to freely circulate around the same. The solid wall of tubes, as 13, is formed by bending the inner row at a point near their lower ends into line with the second row of staggered tubing in the same manner as described with reference to the tubes 12.

From the foregoing description it will be readily understood that the combustion-chamber 3 has a side wall and roof composed of the tubes 12 and an opposite side wall composed of the tubes 13, which, together with the solid back 14, form an inclosed chamber open only at its front portion, as illustrated at 15 and 16 of Fig. 2 of the drawings, so that the heat, gases, and other products of combustion arising from the fire-box must pass forward and through the said open portions 15 and 16 into the flues formed between the walls 12 and 13 and the sides of the boiler-casing and thence along through the said flues the entire depth of the furnace, circulating around the staggered pipes 10 and 11 and passing into the main flue 17 to the smoke-stack 18. It will thus be readily seen that the entire amount of heat in the combustion-chamber is utilized and guided from the forward part of the said chamber in and around the separated tubes, and from thence it passes the entire length or depth of the said furnace, so that the greatest amount of absorption of heat by the water shall be effected, the arrangement of the said tubing being such as to allow the heat-currents to circulate in and around the maximum area of the water-tubes.

The main drum 6, which is centrally disposed in the upper portion of the boiler-casing and into which the upper ends of all of the water-tubes enter, is provided in its upper central portion with a steam-receiver 19, which consists of a pipe extending longitudinally of said drum and supported to the upper portion of the same by means of the straps 20 or by other suitable means. This pipe 19 has in its upper surface a series of perforations, as 21, through which the steam passes after it has been generated to the engine or other apparatus to be operated. The water-inlet pipe 22 enters the drum 6 at its front end and passes longitudinally through the same, it being preferably located in the lower portion of said drum, so as to be immersed in the heated water contained therein, thus utilizing the heat contained in said water to heat the incoming water. This water-inlet pipe 22 communicates with the water-leg 9 at the rear end of the boiler, and thus feeds the lower water-drum 7. From thence the water passes to the tubes located in the combustion-chambers. This construction prevents the cold supply-water from coming in direct contact with parts of the boiler which are under pressure and which, owing to the unequal expansion and contraction due to considerable differences of temperature, would be caused to leak and possibly become unsafe and unreliable.

My improved boiler is preferably constructed with two independent fire-boxes and independent combustion-chambers, having the water-tubes on each side of each combustion-chamber and two independent flues, one on each side of the said combustion-chambers. The central water-drum 7 forms the partition-wall for the lower part of these combustion-chambers 3, and the inner series of water-tubes 10 and 13 in each chamber enter the said central water-drum on each its respective sides, as illustrated in Fig. 1 of the drawings. The upper main drum 6 forms a partition between the upper portion of the two chambers and is large enough to feed and receive the steam from both sets of tubes.

By the construction and arrangement of boiler herein described I am enabled to greatly economize in space and in the cost of construction, while at the same time the efficiency and capacity of my boiler is very materially increased. While I have shown and described my preferred form of construction, I do not wish to be limited to the exact details illustrated, but hold that various changes might be made in the arrangement and details of construction of the different parts without departing from the spirit and scope of my invention.

Having thus described my invention, what I claim, and desire to secure by Letters Patent, is—

1. In a water-tube steam-boiler, the combination with the boiler-casing, an upper generating-drum supported within said casing, a combustion-chamber, water-drums located on each side of the combustion-chamber adjacent to the fire-box, a series of water-tubes connecting the upper drum with one of the lower drums on one side of the combustion-chamber, and a second series of water-tubes on the opposite side of the combustion-chamber extending upwardly and across the top of said chamber and connected with the upper drum at a point substantially below the normal water-line, and with the other lower water-drum.

2. In a water-tube steam-boiler, combustion-flues provided longitudinally of the combustion-chamber having the inner walls adjacent to the combustion-chamber formed of a series of water-tubes in close contact and the other walls formed of the structural casing or wall, said tubes being bent at an angle substantially midway of their lengths, series of water-tubes provided in said combustion-flue connected and shaped substantially similarly to the tubes forming the inner walls of said chamber, said interiorly-disposed series of tubing being separated from each other to allow the products of combustion to freely pass in and about the same, each adjacent series being substantially equally distant from each other and staggered relatively to the proximate series, substantially as described.

3. In a water-tube steam-boiler comprising a main water and steam drum longitudinally disposed in the upper portion of the structure and manifold drums longitudinally disposed in the lower portion of the structure, the said manifold drums being connected by pipe connections and said pipe connections being connected by water-leg with said main drum, combustion-flues provided longitudinally of the combustion-chambers having the walls adjacent to the combustion-chamber formed of a series of water-tubes in close contact, laterally considered, the outer walls of the outermost flues being formed of the casing of the structure, said tubes being bent substantially midway of their lengths, series of water-tubes provided in said combustion-flues connected and shaped substantially similarly to the tubing forming the inner walls of said chamber, said interiorly-disposed series of tubing being spaced and separated from each other substantially equidistantly to allow the products of combustion to freely pass in and about the same, each adjacent series being staggered relatively to the proximate series, substantially as described.

4. In a water-tube steam-boiler, the combination of an inclosing casing, two independent combustion-chambers located therein, a longitudinally-disposed main drum located in the upper portion of the boiler-casing projecting into each of the independent chambers, a lower water-drum longitudinally disposed and forming a partition between the lower portion of the combustion-chambers, a series of water-tubes located on the inner sides of each combustion-chamber connecting the central water-drum with the upper main drum, the said water-tubes extending in a slanting direction toward the center of each combustion-chamber and then in an opposite slant to the bottom portion of the upper main drum, a water-drum located at the outer lower ends of each combustion-chamber, a series of water-tubes extending upwardly from said drum and then obliquely across the tops of the combustion-chambers and connected to the upper main drum substantially below the normal water-line, pipes connecting the three lower drums and a water-leg connecting the same with the upper main drum, substantially as described.

5. The combination with the boiler-casing, a longitudinally-disposed main drum centrally located in the upper portion of the boiler, longitudinally-disposed water-drums located on each side of the lower portion of the combustion-chamber, series of tubes arranged on each side of the combustion-chamber connecting the lower drums with the upper drum, the said tubes being connected to the said drums in staggered or zigzag lines, each series of tubes extending upwardly substantially parallel with the side walls of the boiler and then obliquely to connect with the main drum below the normal water-line, the inner row of tubes each side of the combustion-chamber arranged to stand in lateral contact with each other to within a short distance from the front casing of the boiler thereby forming flues on each side and top of the combustion-chamber opening at their front ends into said combustion-chamber, through which the heated gases must pass to a smoke-flue, substantially as described.

6. In a water-tube steam-boiler an upper main drum located longitudinally in the upper portion of the structure centrally of the same above the combustion-chambers, manifold drums provided longitudinally in the said structure about on the level with the fire-grate of the combustion-chambers adjacent thereto, two combustion-chambers, one of the lower drums being located between the two latter chambers and one on the outer side of each of said combustion-chambers, said lower drums being connected by water-pipe located outside of said combustion-chambers, and water-leg connecting the main upper drum with said piping connection, series of water-tubing connecting each of the lower drums with the upper drum, the inner series of said tubes being compactly arranged together for the greater length of the combustion-chamber, separated and open only at the front end forming substantially the walls of said combustion-chambers, the series of tubing forming the outer walls of each combustion-chamber rising upwardly and inclining slightly inwardly from the lower drum to a point about equal half the length of the said tubing and then bent at an angle inwardly and slightly upwardly to connect with the upper drum substantially below the normal water-line, the series of tubing forming the inner walls of said combustion-chambers extending from the central lower drum and curved or bent inwardly and upwardly toward the center of said combustion-chamber and then bent or curved in the upper portion thereof in the opposite direction and connecting at their upper ends with the main drum adjacent its lowest point, and inner structural walls provided substantially centrally between the main upper drum and the lower central drum thereby forming two longitudinally-disposed central flues between said series of centrally-disposed tubing for the products of combustion to pass from the combustion-chamber to the smoke-flue with which the said flues are connected, and like outer flues formed between the outer walls of the inclosing casing and the series of closely-united tubing connecting the outer lower drums with the upper main drum, and series of water-tubes provided in said combustion-flues connected and shaped substantially similarly to the tubing forming said walls of the combustion-chambers, said interiorly-disposed series of tubing being separated from each other and staggered to allow the products of combustion to freely pass in and about the same in their passage to the smoke-flue, substantially as described.

In witness whereof I have hereunto set my hand this 6th day of October, 1902.

CHARLES L. SEABURY.

Witnesses:
FRANCIS R. DOOLEY,
C. R. HARBAN.